US012665213B2

(12) United States Patent
Kühn et al.

(10) Patent No.: US 12,665,213 B2
(45) Date of Patent: Jun. 23, 2026

(54) STACK MODULE BOX IN CONNECTION WITH A PLURALITY OF MEDIA GUIDES LEADING TO THE STACK MODULE BOX, FUEL CELL DEVICE AND FUEL CELL VEHICLE

(71) Applicants: VOLKSWAGEN AG, Wolfsburg (DE); kraftwerk ASSETS Inc., Wilmington, DE (US)

(72) Inventors: Sascha Kühn, Dresden (DE); Lutz Heinrich, Dresden (DE); Heiko Turner, Vechelde (DE); Dirk Jenssen, Braunschweig (DE); Christian Schlitzberger, Schönebeck (DE); Martin Buchenberger, Wendeburg (DE); Friedhelm Walkling, Braunschweig (DE); Florian Moll, Isenbüttel (DE); Steffen Wieland, Talheim (DE); Christin Zimmermann, Dresden (DE)

(73) Assignees: Volkswagen AG, Wolfsburg (DE); kraftwerk ASSETS Inc., Wilmington, DE (US)

( * ) Notice: Subject to any disclaimer, the term of this patent is extended or adjusted under 35 U.S.C. 154(b) by 524 days.

(21) Appl. No.: 18/001,858

(22) PCT Filed: Jul. 15, 2021

(86) PCT No.: PCT/EP2021/069779
§ 371 (c)(1),
(2) Date: Dec. 14, 2022

(87) PCT Pub. No.: WO2022/013364
PCT Pub. Date: Jan. 20, 2022

(65) Prior Publication Data
US 2023/0261236 A1 Aug. 17, 2023

(30) Foreign Application Priority Data

Jul. 17, 2020 (DE) ..................... 10 2020 119 020.4

(51) Int. Cl.
*H01M 8/2475* (2016.01)
*H01M 8/04082* (2016.01)
*H01M 8/10* (2016.01)

(52) U.S. Cl.
CPC ..... *H01M 8/2475* (2013.01); *H01M 8/04201* (2013.01); *H01M 2008/1095* (2013.01)

(58) Field of Classification Search
CPC .......... H01M 8/2475; H01M 8/04201; H01M 2008/1095
See application file for complete search history.

(56) References Cited

U.S. PATENT DOCUMENTS

2005/0014058 A1    1/2005 Dave et al.
2005/0016064 A1*   1/2005 Agnew ................ B01J 19/2415
                                                          48/212

(Continued)

FOREIGN PATENT DOCUMENTS

KR    20050070724 A    7/2005
KR      100738308 B1    7/2007
KR    20140125219 A   10/2014

OTHER PUBLICATIONS

International Preliminary Report on Patentability, dated Oct. 18, 2022, for International Patent Application No. PCT/EP2021/069779. (5 pages).

(Continued)

*Primary Examiner* — Keith Walker
*Assistant Examiner* — Steven S Ha
(74) *Attorney, Agent, or Firm* — Seed Intellectual Property Law Group LLP

(57) ABSTRACT
A system includes a stack module box, within which is accommodated a fuel cell stack and which stack module box (Continued)

has at least one fuel cell, the fuel cell being in connection with a plurality of media guides leading to the stack module box and from which media can be delivered to the stack module box or received from the stack module box, wherein at least two of the media guides have electrically conductive regions for discharge of current from the fuel cell stack, and/or the wall of the stack module box is electrically conductive in the regions laying opposite to the media guides, and wherein connection lines are led away from the fuel cell stack to the electrically conductive regions and away therefrom. A fuel cell device and a fuel cell vehicle including such a stack module box are also provided.

9 Claims, 4 Drawing Sheets

(56)                    References Cited

U.S. PATENT DOCUMENTS

| | | |
|---|---|---|
| 2005/0089736 A1 | 4/2005 | Meyers et al. |
| 2006/0194099 A1 | 8/2006 | Shu et al. |
| 2015/0024299 A1 | 1/2015 | Yu et al. |

OTHER PUBLICATIONS

International Search Report, mailed Nov. 8, 2021, for International Patent Application No. PCT/EP2021/069779. (2 pages).

* cited by examiner

STACK MODULE BOX IN CONNECTION WITH A PLURALITY OF MEDIA GUIDES LEADING TO THE STACK MODULE BOX, FUEL CELL DEVICE AND FUEL CELL VEHICLE

BACKGROUND

Technical Field

Embodiments of the invention relate to a stack module box, within which is accommodated a fuel cell stack and which stack module box has at least one fuel cell, the fuel cell stack being in connection with a plurality of media guides leading to the stack module box, from which media can be delivered to the stack module box or received from the stack module box. Embodiments of the invention further relate to a fuel cell device and a fuel cell vehicle having such a stack module box.

Description of the Related Art

Fuel cells are used to provide electrical energy in a chemical reaction between a hydrogen-containing fuel and an oxygen-containing oxidant, usually air. In a solid oxide fuel cell (SOFC), an electrolyte layer thereby consists of a solid material from which the name is derived, for example, ceramic yttrium-doped zirconium dioxide, which is capable of conducting oxygen ions, whereas electrons are not conducted. The electrolyte layer is incorporated between two electrode layers, namely the cathode layer, which is supplied with the air, and the anode layer, which is supplied with the fuel, which may be formed by $H_2$, CO, $CH_4$ or similar hydrocarbons. When the air is fed through the cathode layer to the electrolyte layer, the oxygen takes up two electrons and the oxygen ions $O^{2-}$ that are formed move through the electrolyte layer to the anode layer, wherein the oxygen ions react with the fuel to form water and $CO_2$. On the cathode side, the following reaction takes place: $\frac{1}{2}\ O_2 + 2e^- 2O^{2-}$ (reduction/electron uptake). At the anode, the following reactions take place: $H_2 + O^{2-} H_2O + 2e^-$ as well as $CO + O^{2-} CO_2 + 2e^-$ (oxidation/electron release).

In order to increase the electrical power provided by a fuel cell device, it is possible to combine several fuel cells in a fuel cell stack provided in a stack module box, for which a sufficient supply of reactants must be ensured, which reactants are supplied to the fuel cell stack and in this fuel cell stack are fed to the fuel cells by media guides.

In KR 20050070724 A, a fuel cell is shown with which methanol at a uniform concentration may be transferred to an electrode, wherein the fuel cell comprises a cylindrical fuel supply tube having a plurality of openings for delivering the fuel to the outer periphery, and a cylindrical air supply tube having a plurality of openings for delivering the air. A membrane electrode assembly (MEA) is placed between the two tubes. In turn, tubular current collectors are placed between the MEA and the tubes. KR 100738308 B1 discloses a solid oxide fuel cell having a cylindrical construction and a fuel supply tube arranged in the center; a metallic fabric is arranged between the fuel supply tube and the anode. A wire is wound about the cathode for discharge of current. A flexible fuel cell is described in US 2006/0194099 A1, in which the anode current collection layer is used as a media guide for the air supply.

BRIEF SUMMARY

Some embodiments include a stack module box, within which is accommodated a fuel cell stack and which stack module box has at least one fuel cell, the fuel cell stack being in connection with a plurality of media guides leading to the stack module box, from which media can be delivered to the stack module box or received from the stack module box, wherein at least two of the media guides have electrically conductive regions for discharge of current from the fuel cell stack, and/or the wall of the stack module box is electrically conductive in the regions laying opposite to the media guides, and wherein connection lines are led away from the fuel cell stack to the electrically conductive regions and away therefrom.

Some embodiments provide a stack module box in connection with a plurality of media guides leading to the stack module box, which has a compact construction. It is furthermore a task that these media guides are to be used as current conductors to prevent unnecessary heat dissipation from the stack module box as well as to provide an improved fuel cell device and an improved fuel cell vehicle.

The stack module box in some embodiments in connection with a plurality of media guides leading to the stack module box is characterized in that a small number of components is sufficient by assigning an additional function to the media guides and/or the wall, which is, in particular, electrically conductive. Additional components or lines are thereby dispensed with and result in the desired compact construction. The media guides leading away from the stack module box thus serve to conduct current, which can thus be guided to remote areas without further components, so that there is less thermal mass and also less heat dissipation, which is particularly significant in the case of solid oxide fuel cells that need to be operated at high temperatures. The number of components that are dispensed with reduces system complexity and simplifies assembly.

In so doing, there is also the possibility that the electrically conductive area of the wall is in contact with the electrically conductive area of the media guide laying opposite to it, which is to say the connection line from the fuel cell stack only needs to be routed to the wall that makes electrical contact with the media guides.

A clamping device of a clamping system may be guided around the media guides, and the clamping device may include at least two electrically conductive sections that are electrically insulated from one another and rest against the electrically conductive media guides. In so doing, the clamping device can also be used to pass on the current that has already been conducted out of the fuel cell stack via the wall or the media guide, so that there are a wide range of spatial possibilities for ultimately collecting the current. The insulation of the section thereby allows the use of the clamping device for contacting both electrodes.

The media guides and/or a distribution structure of the stack module box may have a spring function in order to assign them a further function.

In this, there is the possibility that the clamping device is guided around four media guides in the circumferential direction of the stack module box.

Alternatively, the clamping device can be guided around the stack module box in the longitudinal direction of two of the media guides, wherein the stack module box can be provided several times in a sequence corresponding to the pathway of the clamping device.

The above-mentioned advantages and effects also apply to a fuel cell device having a stack module box in connection with a plurality of media guides of the type described above which are leading to the stack module box, as well as to a fuel cell vehicle having such a fuel cell device.

The features and combinations of features mentioned above in the description as well as the features and combinations of features mentioned below in the description of figures and/or shown alone in the figures can be used not only in the respectively indicated combination, but rather also in other combinations or on their own. Thus, embodiments which are not explicitly shown or explained in the figures, but which arise from the elucidated embodiments and are producible by separate combinations of features, are also to be considered as encompassed and disclosed by the present disclosure.

BRIEF DESCRIPTION OF THE SEVERAL VIEWS OF THE DRAWINGS

Further advantages, features and details will be apparent from the claims, from the following description of embodiments as well as from the drawings.

DETAILED DESCRIPTION

A fuel cell device comprises a fuel cell stack 1 having a plurality of fuel cells 2 connected in series. The fuel cell device can, for example, be part of a fuel cell vehicle not shown in more detail. In this, the fuel cell 2 may, in particular, also be formed by solid oxide fuel cell.

Each of the fuel cells 2 comprises an anode and a cathode, as well as an ion-conductive membrane separating the anode from the cathode. Fuel (for example, hydrogen) is supplied by means of an anode supply line via anode compartments within the fuel cell stack 1 to the anodes from a gas pressure reservoir. Cathode gas (for example, oxygen or oxygen-containing air) may be supplied to the cathodes by means of a cathode supply line via cathode compartments within the fuel cell stack 1. The fuel cell device may moreover comprise a coolant circuit for temperature control of the fuel cell stack 1.

The fuel, the cathode gas and, if necessary, the coolant must be fed into and discharged from the fuel cell stack 1, for which purpose media guides 3 are used.

Figures 1, 2:
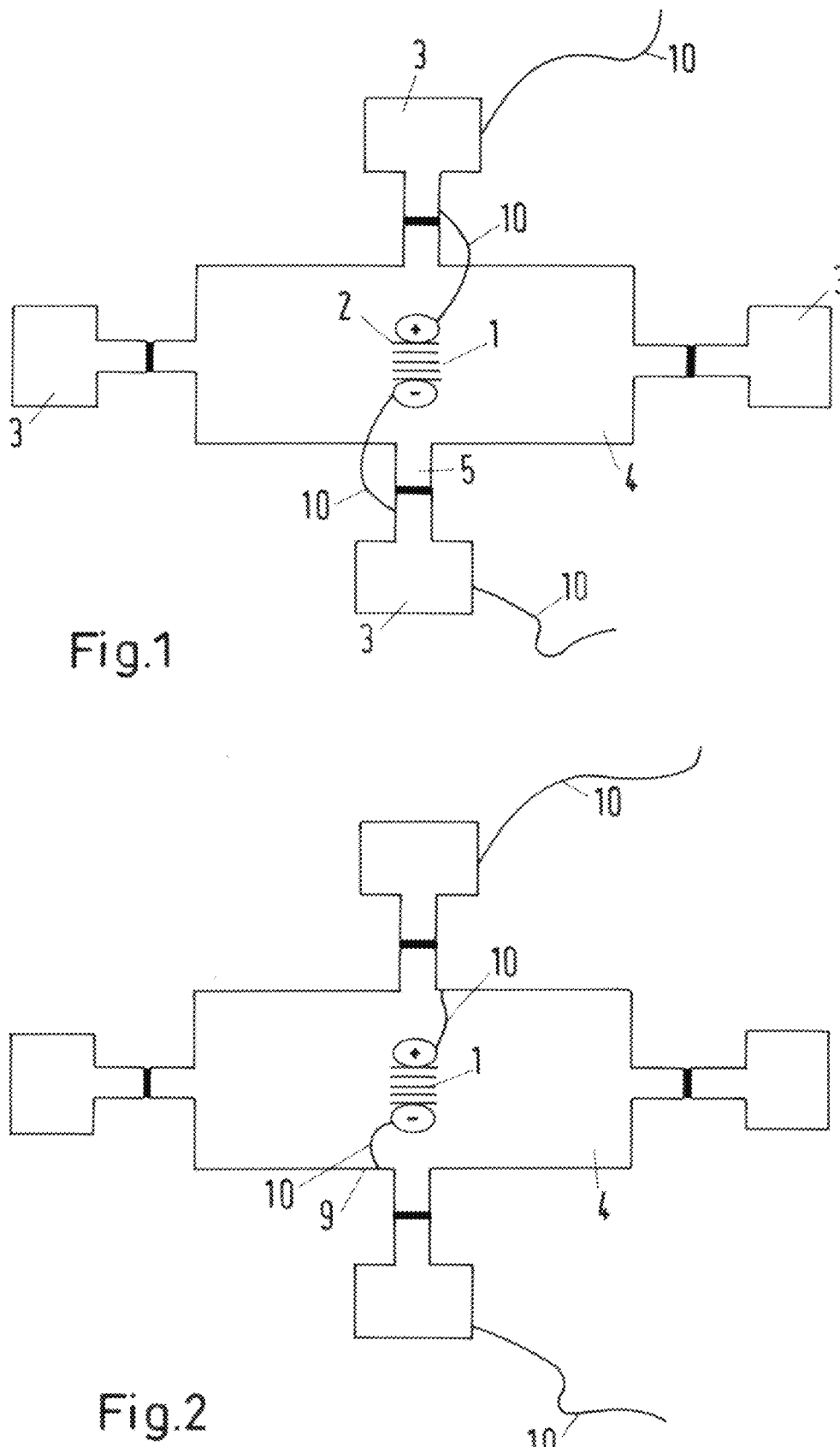
FIG. 1 shows a schematic representation of a cross-section through a stack module box with the discharge of current via the media guides.
FIG. 2 shows a representation corresponding to FIG. 1 with the inclusion of the wall of the stack module box in the discharge of current.

FIG. 1 shows a highly simplified representation of a fuel cell stack 1, which is accommodated in a stack module box 4. The reactants, which is to say the fuel and the oxidant, are fed to the stack module box 4 via the media guides 3 and distributed to the electrodes via a distribution structure 5 in the stack module box 4.

Figure 4:
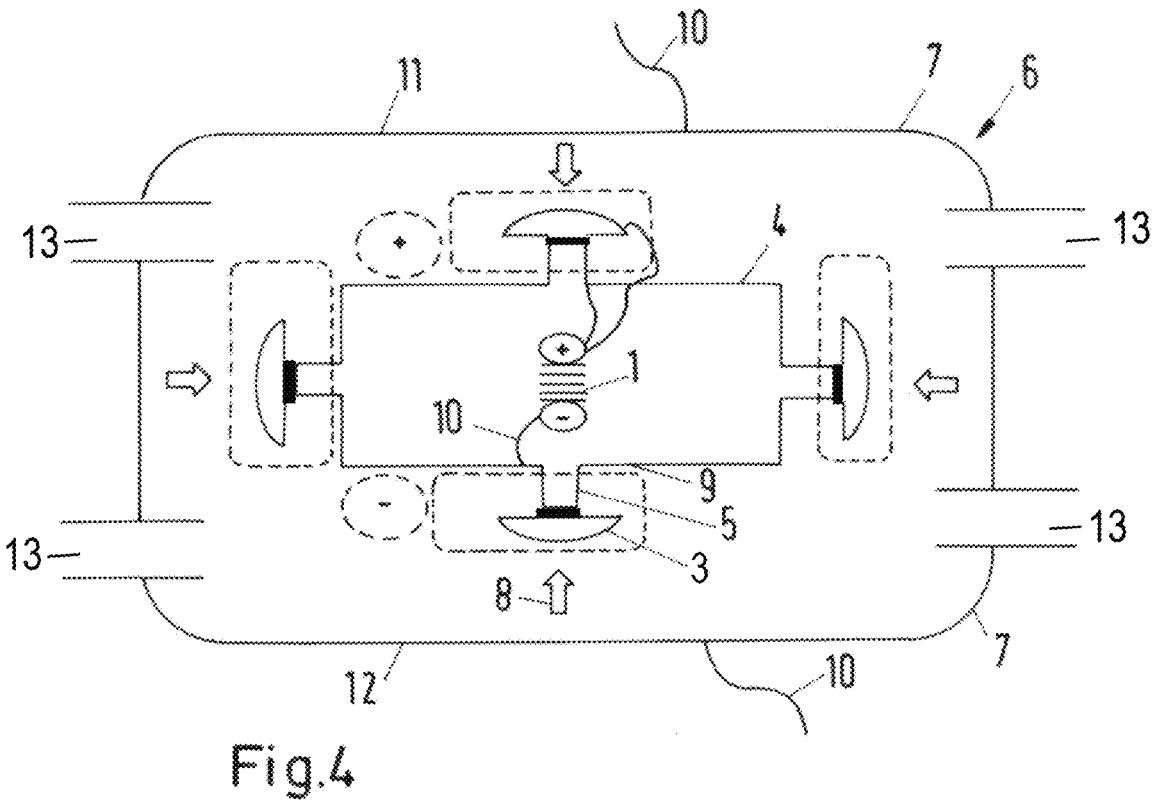
FIG. 4 shows a schematic representation of a cross-section through a stack module box, with the clamping system exerting a clamping force by means of a clamping device, with discharge of current via the media guides and the clamping system.
Figure 5:
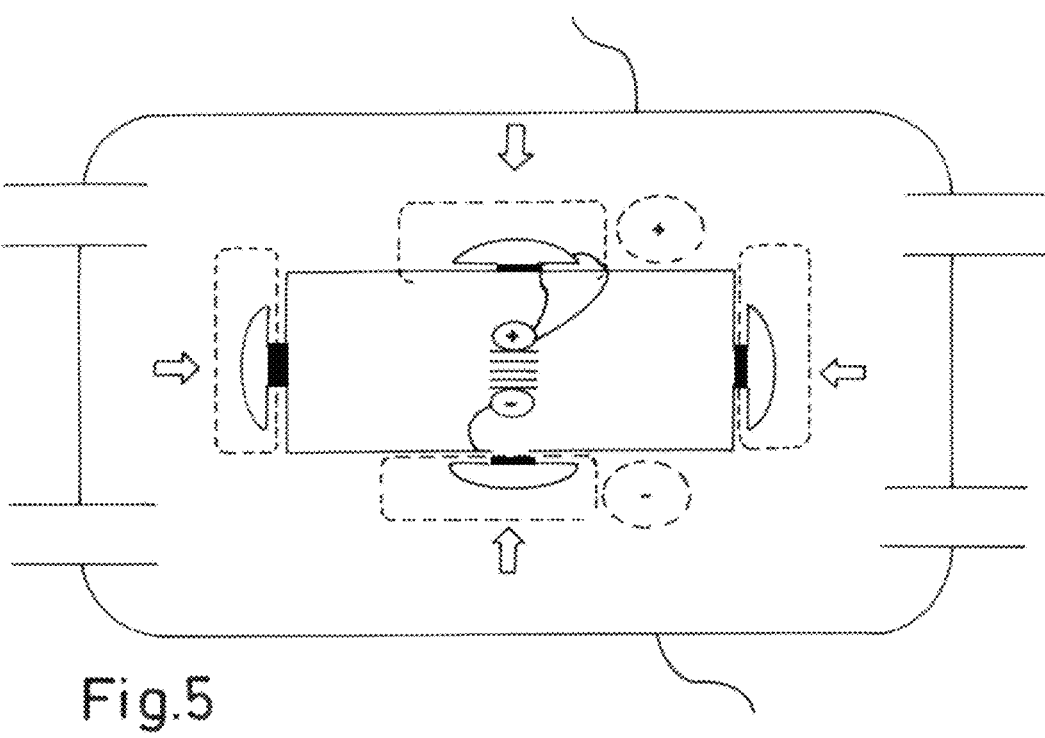
FIG. 5 shows a representation corresponding to FIG. 4 with a clamping force that is greater than in FIG. 4.

A clamping system 6 is guided around the stack module box 4, the clamping device 7 of which surrounds the distribution structure 5, which is designed with a spring function and is formed by gas channels on the outside, wherein the spring action is indicated in FIG. 4 and FIG. 5, as the response to the clamping force indicated by arrows 8.

The stack module box 4 together with the fuel cell stack 1 accommodated within it and which fuel stack has at least one fuel cell, in particular, a solid oxide fuel cell, is thus in connection with a plurality of media guides 3 leading to the stack module box 4, from which media can be delivered to the stack module box 4 or taken up from the stack module box 4. In FIG. 1, two of the media guides 3 for conducting current out of the fuel cell stack 1 have electrically conductive areas or are formed overall from an electrically conductive material.

Figure 3:
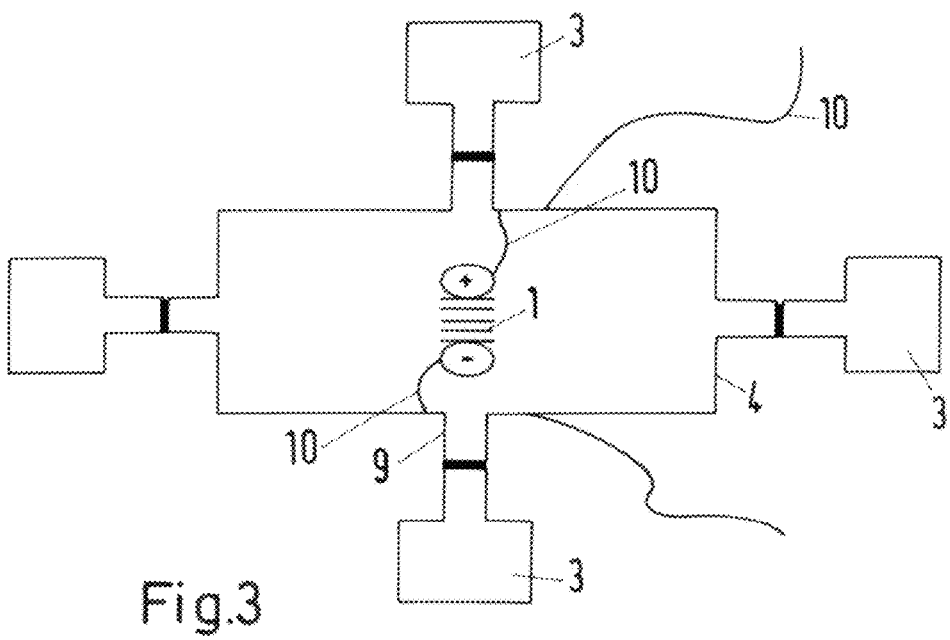
FIG. 3 shows a representation corresponding to FIG. 1 with the discharge of current exclusively via the wall of the stack module box.

FIG. 3 shows that the wall 9 of the stack module box 4 is electrically conductive, in the example shown in the areas laying opposite to the media guides 3. Connection lines 10 are led from the fuel cell stack 1 to the electrically conductive areas of the media guides 3 and/or of the wall 9 and are led away from them.

FIG. 2 shows an embodiment in which the electrically conductive area of the wall 9 is in contact with the electrically conductive area of the media guide 3 laying opposite to it.

Figure 7:
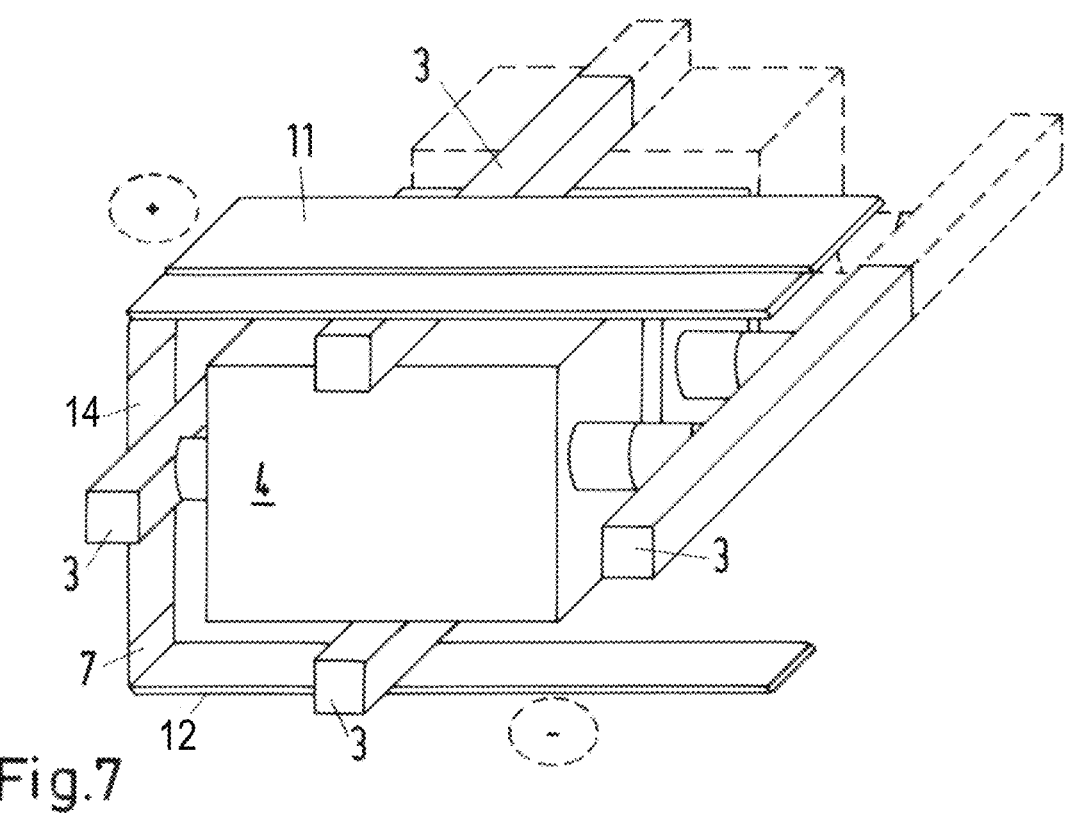
FIG. 7 shows a schematic, perspective view of the embodiment in FIG. 6.

FIG. 4, in combination with FIG. 5, refers to an embodiment in which the clamping device 7 of the clamping system 6 is guided around the media guides 3, wherein the clamping device 7 comprises at least two electrically conductive sections 11, 12 which are electrically insulated from one another, as illustrated schematically by gaps 13 (which may be non-conductive sections 14 of the clamping device 7, as shown in FIG. 7), and rest against the electrically conductive media guides 3. The media guides 3 and/or the distribution structure 5 of the stack module box 4 here additionally have a spring function, as can be appreciated by the schematic illustration of the media guides 3, which may elastically deform in response to force applied by the clamping device 7.

In the embodiments elucidated above, current is discharged from the stack module box 4 through structures already present and required for operation, so that a reduction in the complexity of the stack module box 4 is achieved, with the possibility of supplying the current to remote areas. Due to the characteristics of direct current, care has been taken to provide separate current lines from both electrodes, so that isolated, which is to say electrically non-conductive, regions are provided in the wall 9 of the stack module box 4 and of the clamping device 7.

Figure 6:
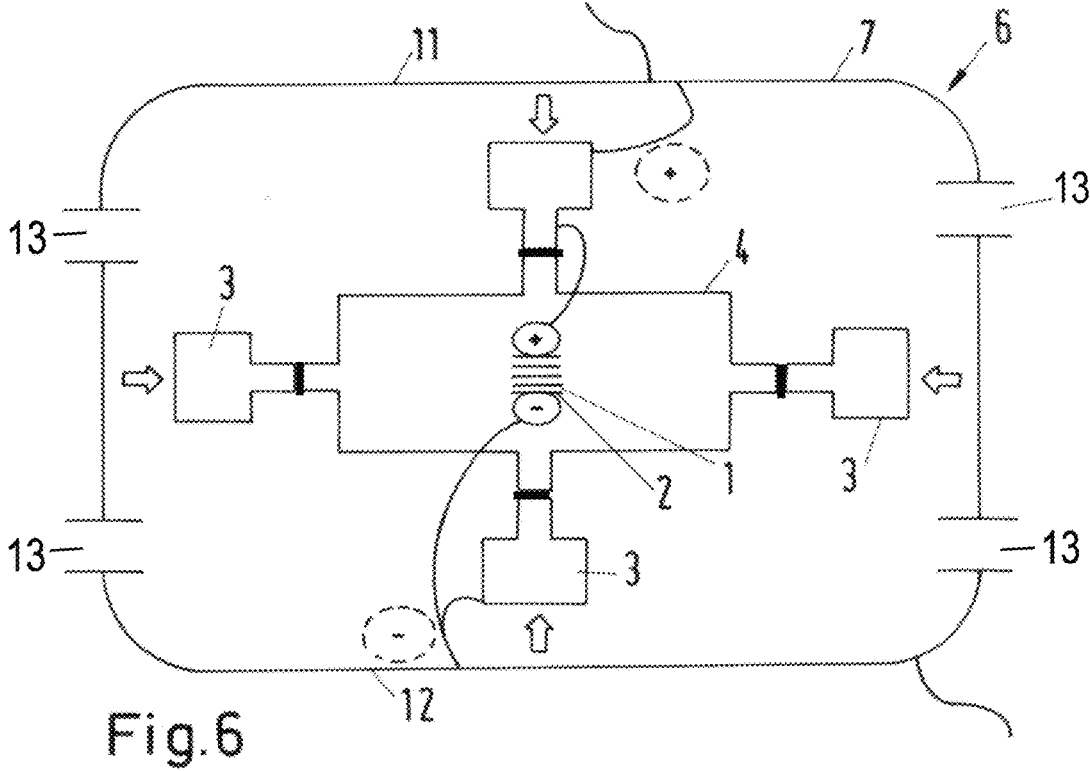
FIG. 6 shows an embodiment corresponding to FIG. 1 with action upon all the media guides by the clamping system.
Figure 8:
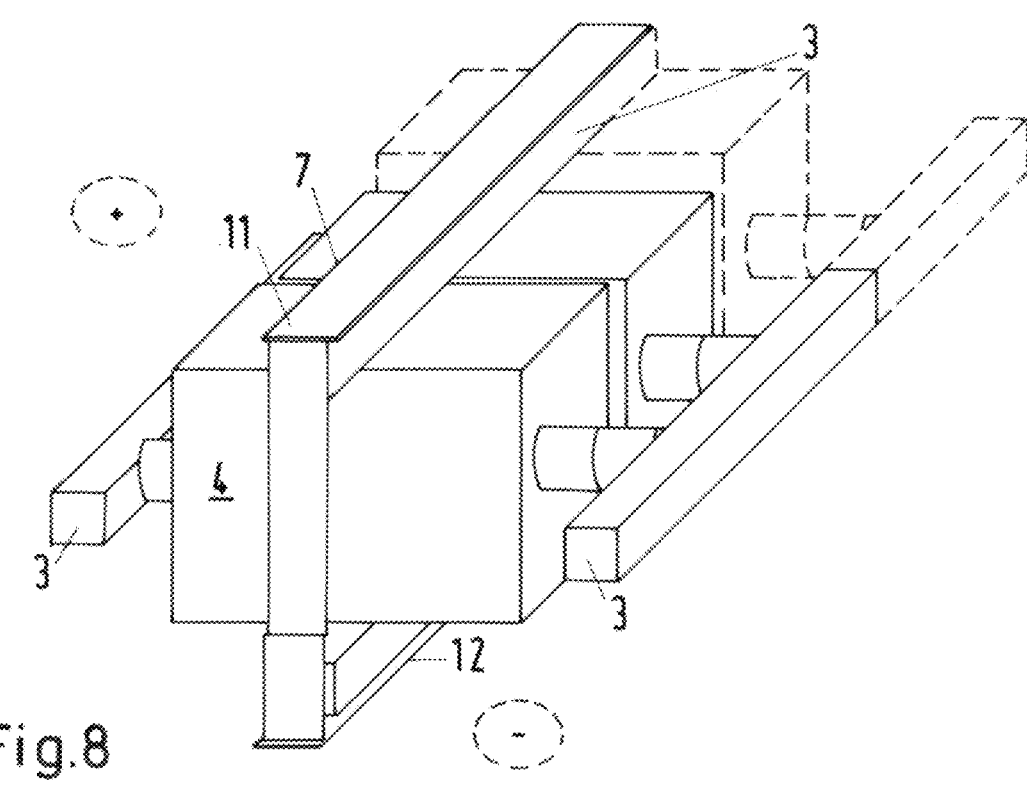
FIG. 8 shows a representation of a further embodiment corresponding to FIG. 7.

FIG. 6 and FIG. 7 show that the clamping device 7 is guided around four media guides 3 in the circumferential direction of the stack module box 4, whereas FIG. 8 highlights the possibility that the clamping device 7 can be guided around the stack module box 4 in the longitudinal direction of two of the media guides 3, which is particularly useful if the stack module box 4 is provided several times in a sequence corresponding to the pathway of the clamping device 7.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:

a stack module box within which is accommodated a fuel cell stack and which fuel cell stack has at least one fuel cell, the fuel cell stack being in connection with a plurality of media guides leading to the stack module box and from which media can be delivered to the stack module box or received from the stack module box, wherein at least two of the media guides have electrically conductive regions configured to conduct current away from the fuel cell stack, and/or a wall of the stack module box is electrically conductive in regions opposing the media guides, and wherein connection lines are led away from the fuel cell stack to the electrically conductive regions of the at least two media guides and/or the wall of the stack module box and away therefrom.

2. The system according to claim 1, wherein each electrically conductive region of the wall is in contact with a corresponding one of the electrically conductive regions of the media guides, which is positioned opposite thereof.

3. The system according to claim 1, wherein a clamping device of a clamping system is guided around the media guides, and in that the clamping device comprises at least two electrically conductive sections which are electrically insulated from one another and rest against the electrically conductive regions of the media guides.

4. The system according to claim 3, wherein the media guides and/or a distribution structure of the stack module box are configured to elastically deform in response to a force applied by the clamping device.

5. The system according to claim 3, wherein the clamping device is guided around four media guides in the circumferential direction of the stack module box.

6. The system according to claim 3, wherein the clamping device is guided in a longitudinal direction of two of the media guides around the stack module box.

7. The system according to claim 6, wherein a plurality of stack module boxes are provided along a path of the clamping device.

8. A fuel cell device having a system according to claim 1.

9. A fuel cell vehicle comprising a fuel cell device according to claim 8.

* * * * *